(12) United States Patent
Bosio et al.

(10) Patent No.: US 11,815,204 B2
(45) Date of Patent: Nov. 14, 2023

(54) JOINT FOR HYDRAULIC CONNECTION

(71) Applicant: DYAPASON S.r.l., Castel Goffredo (IT)

(72) Inventors: Orlando Bosio, Casaloldo (IT); Andrea Bosio, Casaloldo (IT)

(73) Assignee: DYAPASON S.r.l., Castel Goffredo (IT)

( * ) Notice: Subject to any disclaimer, the term of this patent is extended or adjusted under 35 U.S.C. 154(b) by 0 days.

(21) Appl. No.: 17/575,272

(22) Filed: Jan. 13, 2022

(65) Prior Publication Data
US 2022/0228685 A1  Jul. 21, 2022

(30) Foreign Application Priority Data
Jan. 15, 2021 (IT) .......................... 102021000000674

(51) Int. Cl.
*F16L 27/08* (2006.01)
*F16L 15/08* (2006.01)

(52) U.S. Cl.
CPC ........... *F16L 27/0849* (2013.01); *F16L 15/08* (2013.01)

(58) Field of Classification Search
CPC . F16L 27/0849; F16L 27/0845; F16L 27/093; F16L 27/0837
USPC ......................................... 285/185, 279, 280
See application file for complete search history.

(56) References Cited

U.S. PATENT DOCUMENTS

| | | | | |
|---|---|---|---|---|
| 359,394 A | * | 3/1887 | Jones et al. ............ | G01B 5/204 411/389 |
| 628,692 A | * | 7/1899 | Campbell ........... | F16L 27/0849 285/181 |
| 694,321 A | * | 2/1902 | Moran ................ | F16L 27/0845 403/57 |
| 1,123,839 A | * | 1/1915 | Bridges .............. | F16L 27/0849 184/105.3 |
| 1,160,639 A | * | 11/1915 | Mooney ............. | F16L 27/0816 285/332 |
| 1,754,687 A | * | 4/1930 | MacLellan ......... | F16L 27/0845 285/279 |
| 1,765,693 A | * | 6/1930 | Muend ................ | F16L 27/0845 285/181 |
| 1,872,666 A | * | 8/1932 | Brownell ............... | F16L 39/04 285/221 |
| 2,446,327 A | * | 8/1948 | Heinrich ............. | F16L 27/0804 285/332 |
| 2,831,709 A | * | 4/1958 | Shaw .................. | F16L 27/0845 277/362 |
| 3,746,068 A | * | 7/1973 | Deckert ................ | F16B 39/225 427/136 |
| 4,535,938 A | * | 8/1985 | Lindabury, Sr. .... | F16L 27/0837 239/269 |
| 5,149,120 A | * | 9/1992 | Halliday ................. | A61G 5/10 280/649 |
| 5,275,444 A | * | 1/1994 | Wythoff .............. | F16L 27/0849 285/272 |

(Continued)

*Primary Examiner* — David Bochna
(74) *Attorney, Agent, or Firm* — Greenberg Traurig (57) ABSTRACT

The invention refers to a joint for hydraulic connection, including: an upstream body; a downstream body; and a joining device with screw, extended along a hinging axis, which crosses in succession the upstream body and the downstream body rotatably coupling them with respect to said hinging axis; being further provided an adhesive interposed between thread and counter-thread of the joining device.

15 Claims, 9 Drawing Sheets

(56) References Cited

U.S. PATENT DOCUMENTS

| | | | | |
|---|---|---|---|---|
| 5,405,173 A | * | 4/1995 | Goughneour | F16L 27/0849 |
| | | | | 285/190 |
| 2014/0015246 A1 | * | 1/2014 | Erickson | F16L 27/08 |
| | | | | 285/184 |
| 2014/0261837 A1 | * | 9/2014 | van der Meijden | ............ |
| | | | | F16L 27/0849 |
| | | | | 285/272 |
| 2016/0273690 A1 | * | 9/2016 | Yehud | F16L 27/0861 |
| 2017/0087581 A1 | * | 3/2017 | Yu | B05B 1/16 |

\* cited by examiner

JOINT FOR HYDRAULIC CONNECTION

RELATED APPLICATIONS

The present application claims priority to Italian Pat. App. No. 102021000000674, filed on Jan. 15, 2021, the entire disclosure of which is hereby incorporated herein by reference.

TECHNICAL FIELD

The present disclosure refers to a joint for hydraulic connection. The above-mentioned devices find useful application in the field of faucets and faucet accuracies, in particular they can be used to provide articulated faucets.

BACKGROUND

A joint for hydraulic connection is an element which joins two subsequent segments of a hydraulic connection allowing varying the relative orientation between them.

Joints of this type are typically used in the field of faucets, for example to provide articulated kitchen faucets. In such devices, the traditional water dispensing spout is divided in three or four segments hinged in succession by the joints. By handling the latter, the configuration of the faucet can be modified by bringing the dispensing mouth in the desired position.

The abovementioned joints, in addition to guarantee a perfect hydraulic sealing, shall be specifically adjusted to have a friction torque which can be easily overcome by the user during the handling, but at the same time such as to guarantee a stable position against the gravity action. It is furthermore essential that said friction torque remains unchanged in time, in particular that the hinge will become neither loose due to the wear nor that it will harden for example due to limestone infiltrations.

Due to the above-mentioned reasons, the joints according to the prior art have a considerably structural complexity, which results in high costs of the component.

The joints are further complex to produce, both due to the processing required to make some components and for the subsequent assembly. On the one hand, the complexity derives from the technical features of the joints; on the other hand, it has to be ascribed to the aesthetic quality which is often required to the outer finishings.

The technical problem underlying the present disclosure is therefore to provide a joint which completely or partly solves the drawbacks mentioned with reference to the prior art, and in particular which has a satisfying quality in connection with a simple and economic structure.

SUMMARY

The above-mentioned technical problem is solved by a joint for hydraulic connection, comprising: an upstream body internally comprising an inlet water path with a water inlet of the joint; a downstream body internally comprising an outlet water path with a water outlet of the joint; said inlet water path and said outlet water path being in fluid communication with each other. The joint further comprises a joining device which rotatably couples said upstream body and said downstream body with respect to a hinging axis; said joining device comprising at least one male element extended along said hinging axis and provided with an outer thread and a female element provided with an inner thread, said outer thread being engaged within said inner thread. An adhesive is interposed between said outer thread and said inner thread to lock the male element in the female element.

In particular, the joining device can be represented by a so-called binding screw, or by a stud screw. The binding screw crosses in succession said upstream body and said downstream body; the stud screw instead comprises a screw which crosses at least one of said upstream body and said downstream body and a threaded insert which is integral to the other one of said upstream body and said downstream body, wherein the screw engages.

The use of the binding screw or of the stud screw held by a threaded insert allows a fast and efficient assembly of the joint; in fact, the assembly takes place by tightening the screw on the counter-screw, with an adhesive being interposed between the two elements to provide the definitive cohesion. Advantageously, the tightening can be made with a torque wrench in order to have an accurate control on the friction torque of the joint. The adhesive is preferably a polymeric sealant for threads.

It has been found that the use of the adhesive, even if it gives up the opportunity to adjust and disassemble the joint, guarantees a fast and efficient assembly in connection to satisfactorily maintaining the tightening torque in time.

The upstream body and the downstream body can be right-angled tubular bodies or anyway provided with a transversal connection opening with tubular development, comprising a longitudinal tubular portion provided at the end with an attachment for a segment of hydraulic connection—for example an articulated faucet segment—and a transversal tubular portion. The two transversal tubular portions have an open end.

In assembled configuration, the two transversal tubular portions are coaxial to the hinging axis and their open ends are opposite each other.

In some embodiments, a sliding sleeve or ring can be interposed between upstream body and downstream body.

In some embodiment, the transversal tubular portion of the upstream body and the transversal tubular portion of the downstream body can both comprise, at the open end thereof, a recess defining a cylindrical surface and a shoulder. The sliding sleeve can be thus supported by the cylindrical surfaces of the recesses and abutting onto corresponding shoulders.

In other words, the sliding sleeve accommodates in a toroidal cradle defined by the two opposite recesses of the upstream body and of the downstream body.

In another embodiment, the recess is provided only on the transversal tubular portion of the downstream body; the tubular portion of the upstream body is here inserted in the blind hole of a base defining the rest of the body, and the whole projecting portion serves as bearing to the sliding sleeve.

Preferably, sealing gaskets, which prevent the leakage of water outwards, are interposed between the sliding sleeve or ring and the cylindrical surface on which it lies. Preferably, the sealing gaskets are introduced in grooves obtained on the upstream body and on the downstream body. Preferably, two sealing gaskets are provided between sleeve and upstream body and other two sealing gaskets between sleeve and downstream body.

Preferably, the joint further comprises a cylindrical finishing bushing covering the sliding sleeve. The finishing bushing is provided to completely hide the underlying sliding sleeve from the view of the user. The finishing bushing is preferably made of metallic material or of a material treated to appear metallic.

In some embodiments, the sliding sleeve can be preloaded by an internal elastic element, which acts in axial direction.

For example, the sliding sleeve can comprise an inner cylindrical box and an outer cylindrical box which cooperate to define a tubular element with inner cavity, the outer cylindrical box being sliding above the inner cylindrical box. The elastic element, preferably consisting of a spring coil, axially compressed between inner cylindrical box and outer cylindrical box, enters in the inner cavity of said tubular element. In this way, the sliding sleeve works as pretensioning element, maintaining wrapped the joint without slidings between the metal parts and contributing to the overall resistance of the hinge.

Preferably, the two cylindrical boxes are made of plastic with low friction coefficient. Bearing thicknesses for the coil spring, made of metallic material—for example chromed brass—can be inserted in the cavity in order to avoid the direct bearing of the spring on the plastic casing.

In another embodiment, the sliding sleeve or ring is a monolithic sleeve or ring of plastic material; also in this case, a plastic with low friction coefficient or self-lubricating is preferably used.

In the specific case of application of the joints to an articulated faucet, the joints can alternatively engage pretensioned or monolithic sleeves; in particular, the more downstream joints, which have to bear a lower weight and can have lower resistance to the rotation, will be preferably monolithic, the more upstream ones will be preferably pretensioned.

Preferably, the male element and/or the female element which make up the joining device can comprise a terminal head. The terminal head is abutting, except for a possible interposition of washers, onto an abutment surface of the upstream body and/or of the downstream body. The terminal head, in a per se known manner, can have a hexagonal seat for the engagement of a fastening tool.

The washer interposed between terminal head and abutment surface is preferably of antifriction technopolymer.

Preferably, the terminal head is hidden in a respective housing seat of the upstream body and/or of the downstream body, such that it is not visible to the user in an operative configuration.

Sealing means are further provided, preferably a gasket housed along the stem of the male element and/or the female element at the crossing portion of the upstream body and/or of the downstream body, to prevent the leakage of water outside the joint.

In fact, the housing seat can be closed by a finishing plate, of metallic material—preferably of brass—and of particular aesthetic value with respect to the screw head which they hide.

Said finishing plate can comprise a cut-off stem which extends from an internal face, said cut-off stem deriving from the cutting of a chuck gripping shank.

In fact, the finishing plate derives from a semifinished product with a stem elongated to define a gripping shank, which allows a simple processing of the tool for example by lathe, in addition to subsequent processing such as chrome plating and polishing, which are necessary to obtain a valuable aesthetic finishing.

The above-mentioned gripping shank is subsequently cut off maintaining only a stem portion, which enters in the polygonal seat of the screw head which the plate covers.

The finishing plate preferably has an eccentric curvilinear profile, for example an ellipse, which allows a stable engagement inside the respective housing seat.

Furthermore, the finishing plate preferably has an inner shape adapted to snap onto the screw head which it covers.

Further characteristic features and advantages will emerge more clearly from the detailed description provided hereinbelow of a preferred, but not exclusive embodiment of the present disclosure, with reference to the attached figures, provided by way of a non-limiting example.

DETAILED DESCRIPTION

Referring to the attached FIGS. 1-4, 2 denotes generically a first variation of a joint for hydraulic connection, preferably used in an articulated faucet.

The joint 2 according to the first variation is provided to couple two hydraulic connection segments, for example arms of an articulated faucet, in particular at an upstream position. In the case of an articulated faucet with two arms, for example, the joint 2 can advantageously be used to couple a first arm, coupled to the mixer, to a second arm, which connects in turn with a dispensing shower.

The joint 2 comprises two half-parts, respectively called upstream body 20 and downstream body 21, which are rotatable with respect to each other according to a hinging axis x. The upstream body 20 and the downstream body 21 both define a tube curve of 90°, and are thus characterized by a longitudinal tubular portion 203, 213, extended in the direction of the hydraulic segment to which it couples by a dower and/or a half ring, and by a transversal tubular portion 202, 212, which defines the connection between the two bodies. An intermediate tubular fitting 27 is again introduced between the two transversal tubular portions 202, 212.

The connection of the different tubular portions defines a fluid path 200, 210, with double loop at 90°, which connects a water inlet 201 to a water outlet 211.

Figure 1:
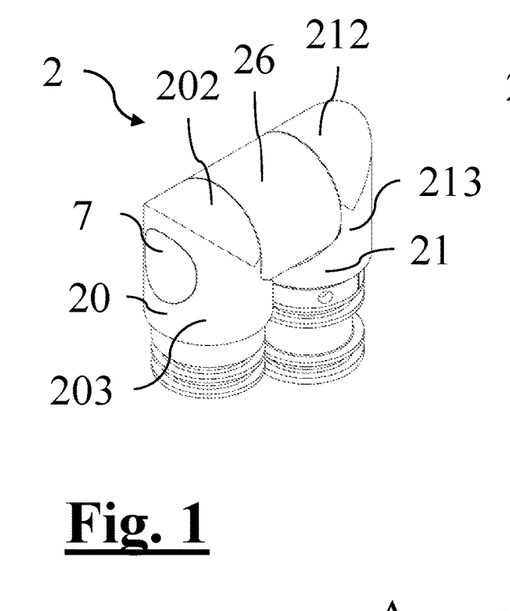
FIG. 1 shows a perspective view of a first joint variation according to the present disclosure, with pretensioned sliding sleeve.
Figure 2:
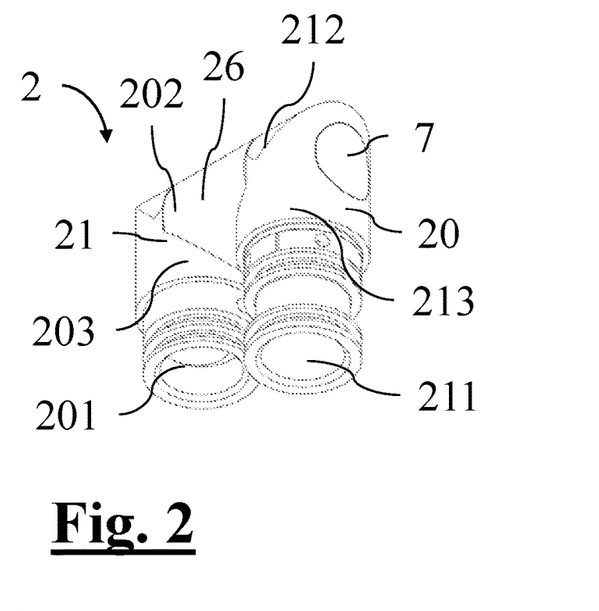
FIG. 2 shows another, differently angled perspective view of the joint of FIG. 1.
Figure 3:
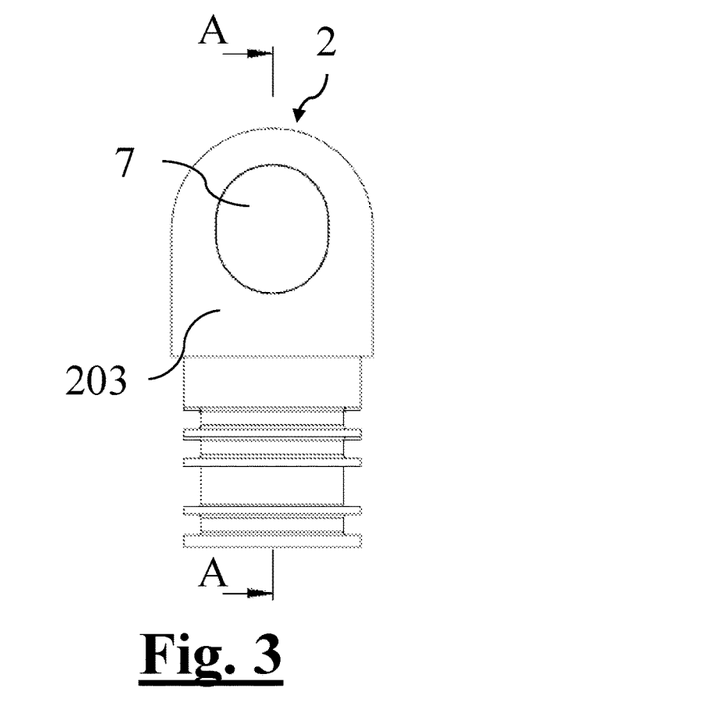
FIG. 3 shows a lateral view of the joint of FIG. 1.
Figure 4:
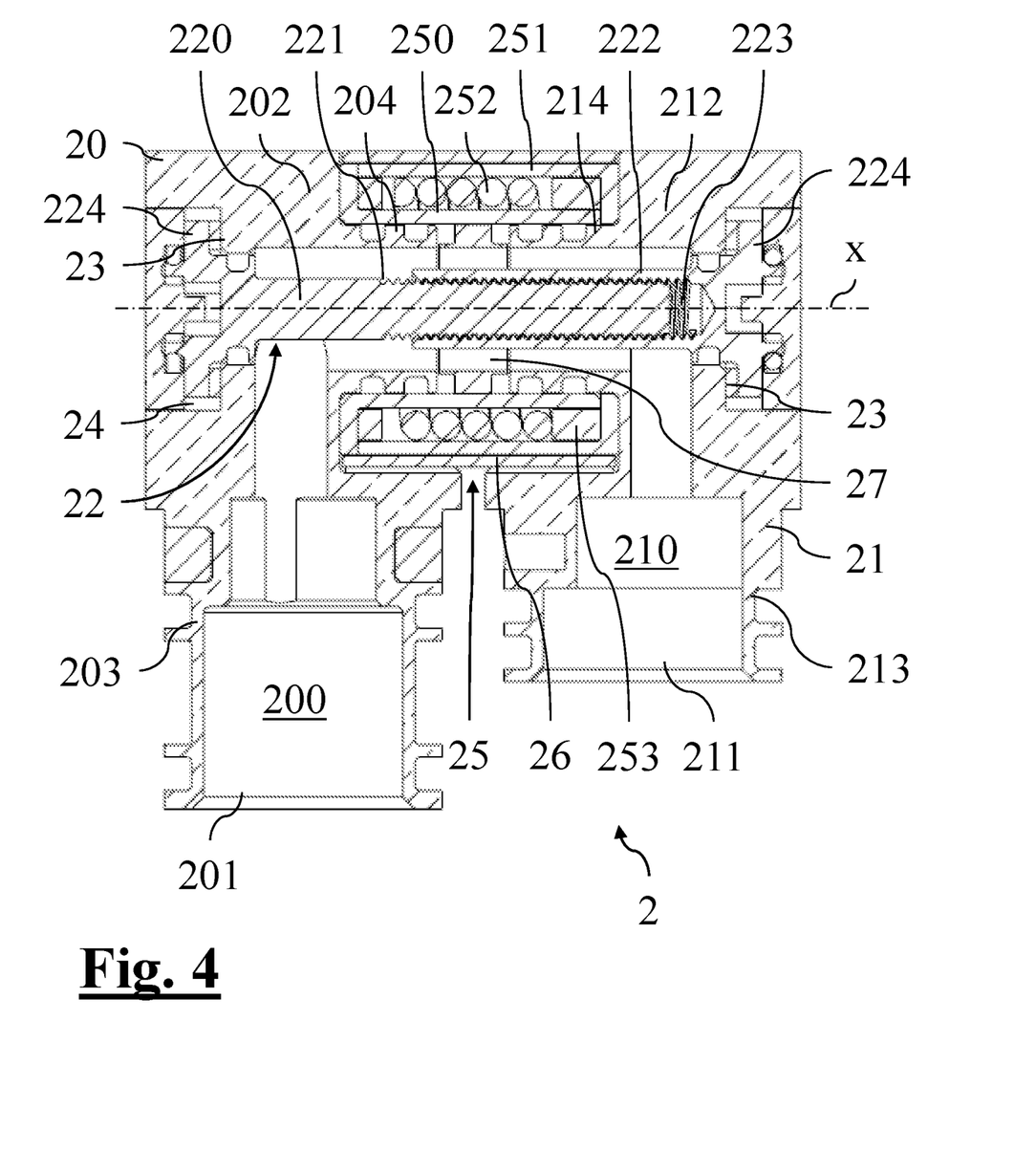
FIG. 4 shows a sectional view of the joint according to the axis A-A of FIG. 3.
Figure 5:
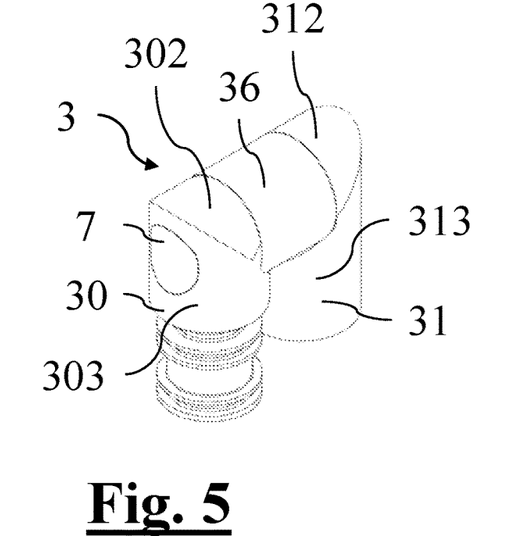
FIG. 5 shows a perspective view of a second joint variation according to the present disclosure, with monolithic sliding sleeve.
Figure 6:
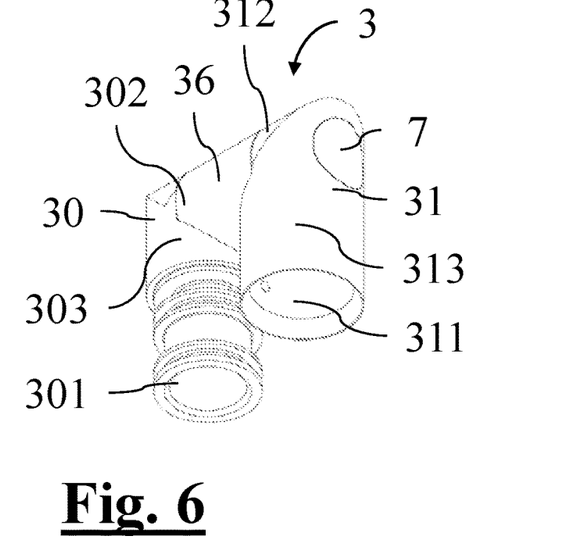
FIG. 6 shows another, differently angled perspective view of the joint of FIG. 5.
Figure 7:
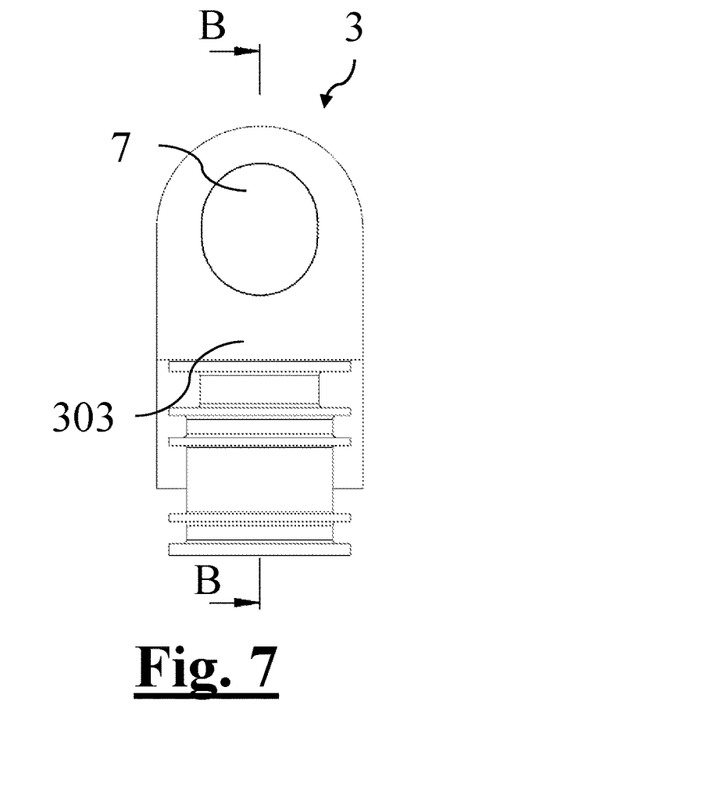
FIG. 7 shows a lateral view of the joint of FIG. 5.
Figure 8:
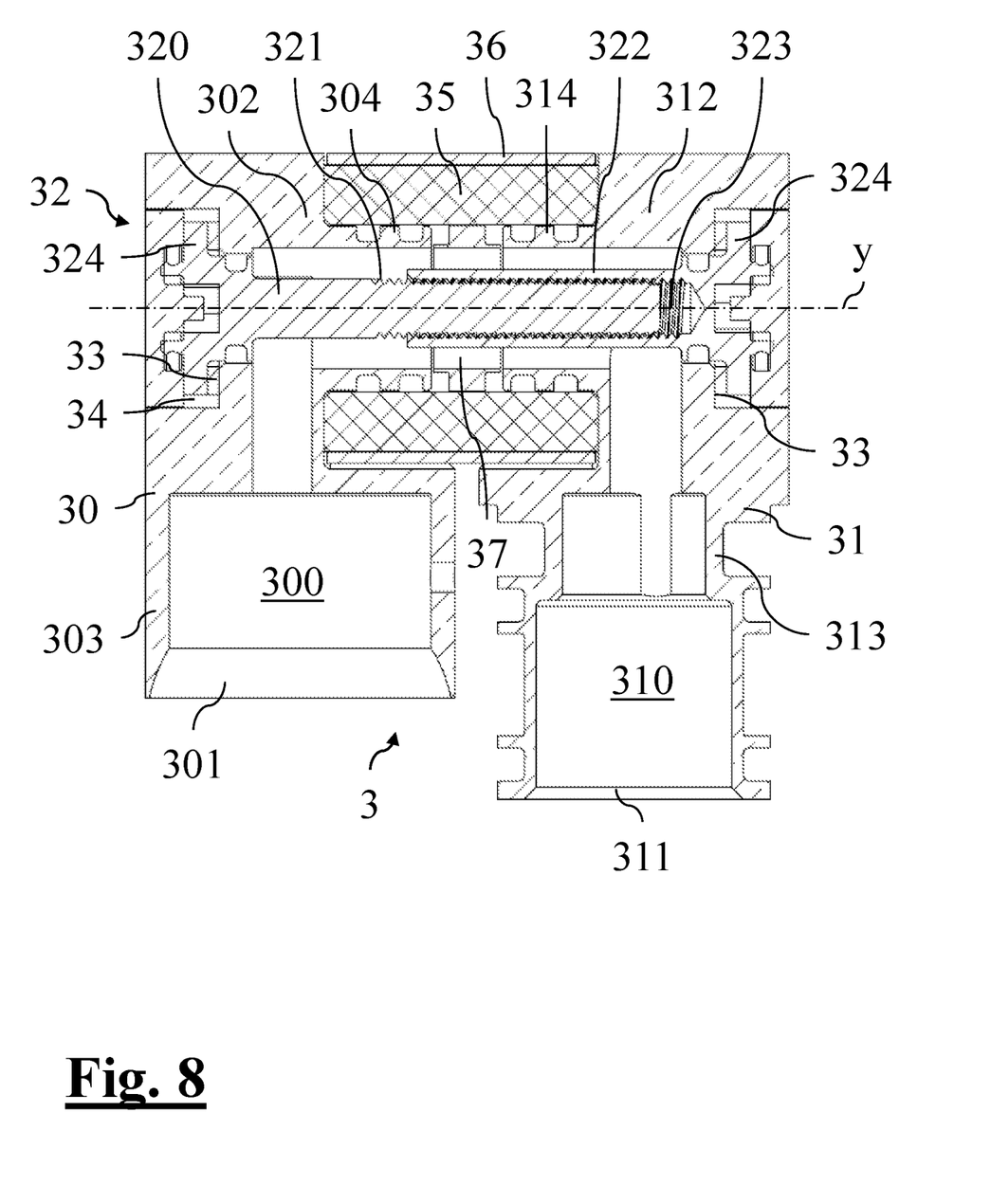
FIG. 8 shows a sectional view of the joint according to the axis B-B of FIG. 7.

The upstream body 20 and the downstream body 21 are made integral by a binding screw 22, which consecutively crosses the two transversal tubular portions 202, 212. The male element 220 and the female element 222 of the binding screw have, as usual, an outer thread 221 and a respective inner thread 223 which allow the mutual fastening thereof. In an assembled configuration, an adhesive, in particular a polymeric adhesive, is placed between the two mutually engaged threads, which adhesive stabilizes them in position.

The two terminal heads 224 of the binding screw 22 come out of the internal fluid path 200, 210 through two through-holes, and are housed in the same amount of housing seats 24 closed by finishing plates 7.

At the transition between terminal head 224 and stem, the male element 220 and the female element 222 of the binding screw 22 have gasket housing grooves, so as to maintain the sealing between internal fluid path 200, 210 and housing seats 24.

The terminal heads 224 rest on the same amount of abutment surfaces 23 of the housing seats, with interposition of antifriction technopolymer washers.

The transversal tubular portions 202, 212, at their ends opposite each other, peripherally have outer cylindrical recesses 204, which define an outer portion with lower diameter connected to the outer profile of the body by a shoulder.

A sliding sleeve 25, which is externally surrounded by a finishing bushing 26 is inserted in the space which is created between the two recesses 204 and above the previously described intermediate tubular fitting 27.

It can be noted that the internal portions of the recesses 204, as well as the outer surface of the intermediate tubular fitting 27, have grooves for sealing gaskets, which serve to the double purpose of avoiding leakage of water outside the joint and to avoid that the same water wets the surfaces of the sliding sleeve 25, with consequent limestone build-up and risk of hardening of the mechanism in time. In this case, two gaskets are provided on the recess 204 of the upstream body 20, two on the recess 204 of the downstream body 21, and other two at the opposite ends of the intermediate tubular fitting 27.

The sliding sleeve 25 has a telescopic structure, and consists of an inner cylindrical box 250 above which an outer cylindrical box 251 slides. The two boxes 250, 251 are preferably of plastic material with low friction coefficient. The connection of the two boxes 250, 251 defines a hollow tubular structure, inside which a coil spring 252 is inserted which lies on metal annular thicknesses 253 at the two ends. As it can be easily understood, the coil spring 252 pushes on the annular thicknesses 253 and, through them, on the boxes 250, 251, which in turn rest on opposite shoulders of the upstream body 20 and of the downstream body 21, acting as pretensioning element of the joint.

Referring to the attached FIGS. 5-8, 3 generically denotes a second variation of a joint for hydraulic connection.

The joint 3 according to the second variation is for example provided to couple two segments of an articulated faucet, in particular at a downstream position. In case of an articulated faucet with two arms, the joint 3 can be advantageously used to couple a second arm of a dispensing shower.

The joint 3 according to the second variation corresponds in its essential parts to the first joint 2. For the description of the structure, reference is therefore made to what is described above, noting that the same numbering has been assigned to identical components by replacing the initial number 2 with the number 3; the hinging axis is here denoted by the letter y.

The joint 3 according to the second variation in fact differs from the joint 2 according to the first variation since it has a full and monolithic sliding sleeve 35, lathe-made preferably of self-lubricating plastic.

In a further, not illustrated, embodiment variation, the monolithic sliding sleeve of the second variation can be replaced by two boxes as in the first variation, but without interposition of the coil spring and/or of the annular thicknesses. A joint with sleeve is thus provided which is not pretensioned without the need to develop components and/or embodiment methods different from those used for the first variation of the joint.

Figure 9:
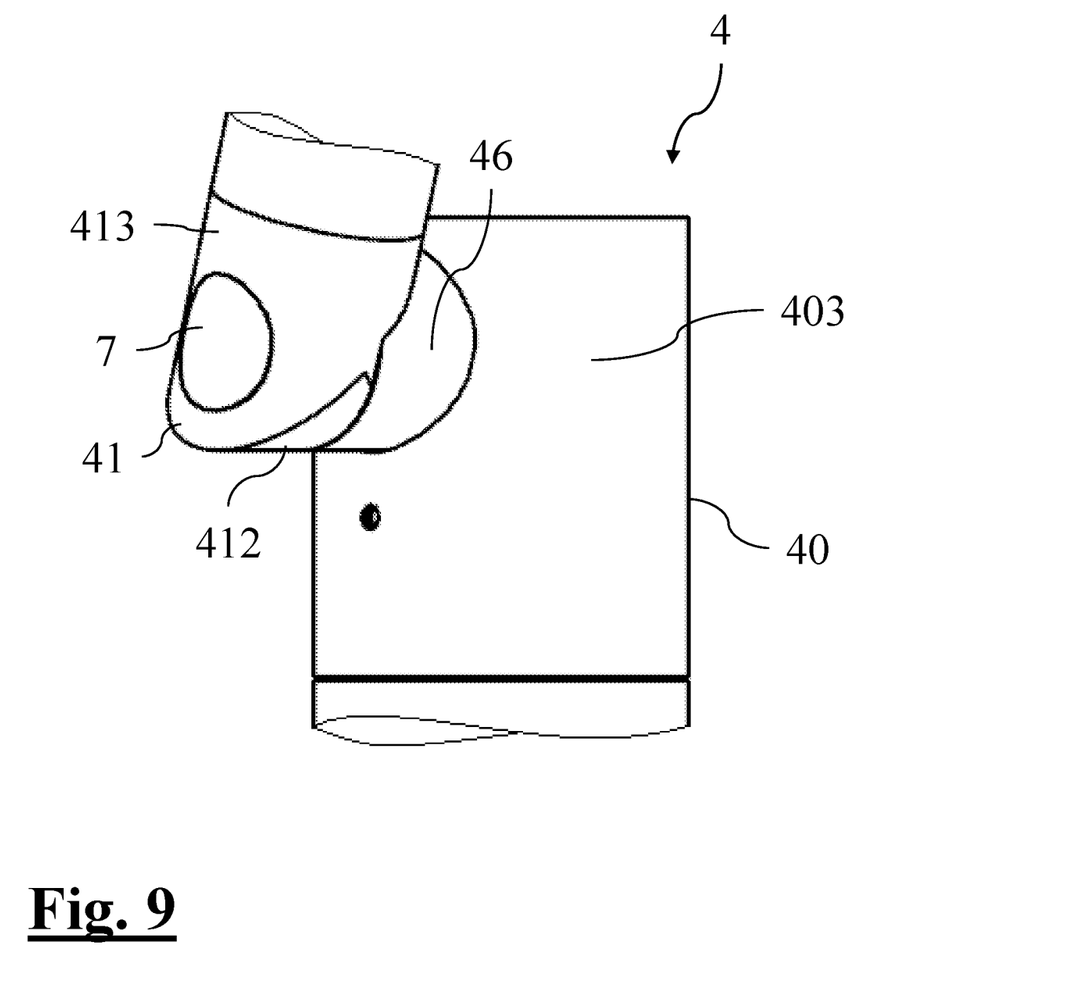
FIG. 9 shows a perspective view of a third joint variation according to the present disclosure.
Figure 10:
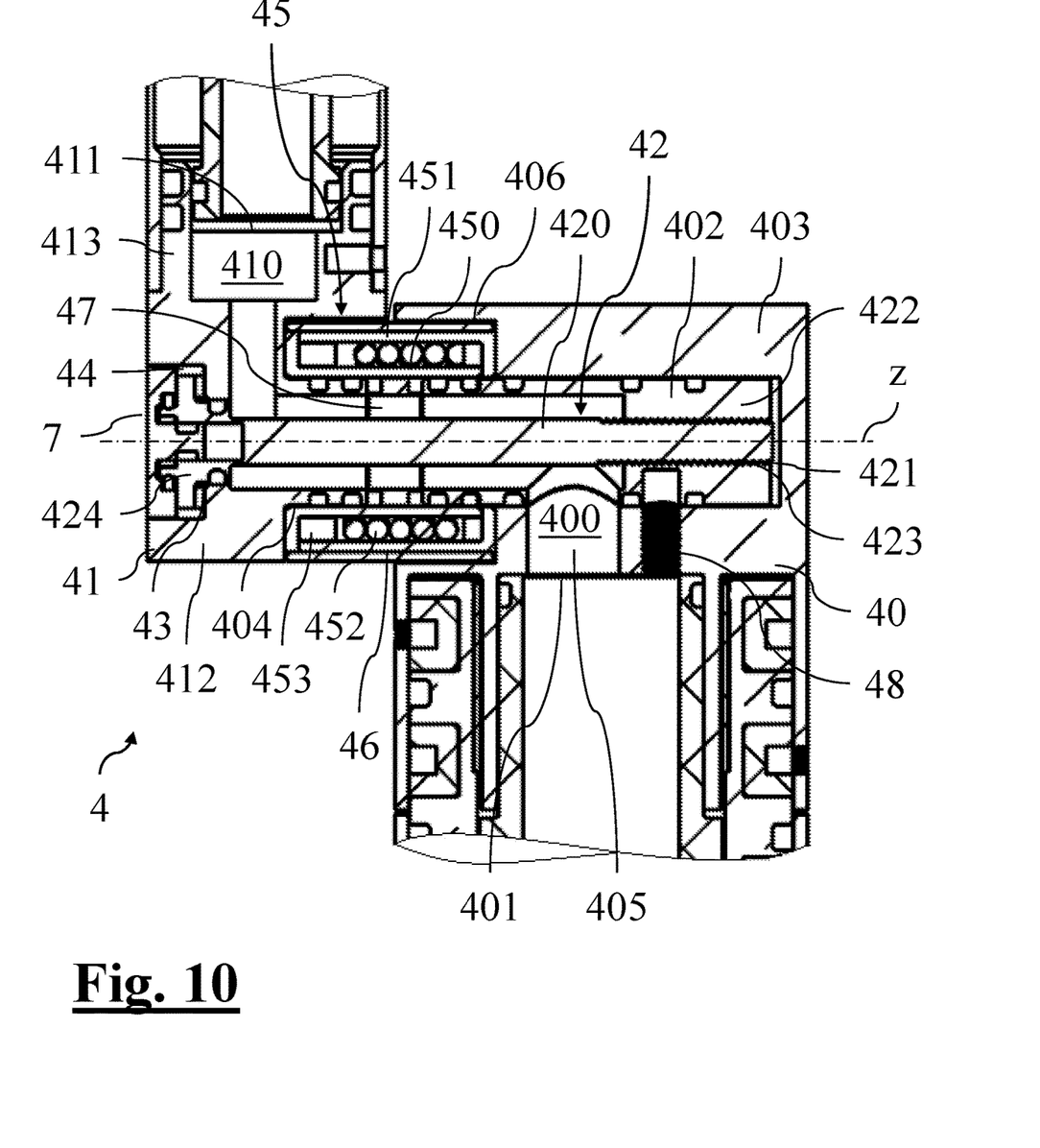
FIG. 10 shows a sectional view of the joint of FIG. 9 with respect to a lying plane of the hinging axis.

Referring to the attached FIGS. 9-10, a third variation of a joint for hydraulic connection is generically denoted by 4.

The joint 4 according to the third variation is for example provided to couple a base of an articulated faucet, comprising the mixer, with a first segment or arm. The joint is thus particularly adapted for the use with an articulated faucet with three arms.

The joint 4 comprises two half-parts, respectively called upstream body 40 and downstream body 41, which are rotatable with respect to each other according to a hinging axis z. The downstream body 41 has substantially equal shape to the one of the corresponding elements of the joint 2, 3 according to the first variations, or has a transversal tubular portion 412 connected at 90° with a longitudinal tubular portion 413. Also in this case, the longitudinal tubular portion 413 couples by a dower and/or half ring to the arm of segment of hydraulic connection which is coaxial thereto.

The upstream body 40 instead comprises a head 403, preferably cylindrical with axis orthogonal to the hinging axis z, provided for example to coaxially couple above a base of the faucet which is also cylindrical, which houses a mixer therein. The head 403 is transversely drilled to house a tubular insert 402, which is preferably cylindrical with axis corresponding to the one of the hinging axis z. The tubular insert 402 has an open end and a full end, which is crossed only by a threaded through-hole with diameter lower than the internal diameter of the rest of the insert to define a threaded bottom 422 of the same insert 402. The open end connects to the transversal tubular portion 412 of the downstream body 41, with interposition of an intermediate tubular fitting 47. At the full end, a lateral hole 405 is instead provided, which is aligned with a lower hole obtained in the head 403 to provide the fluid communication with the underlying mixer body. A dowel 48, which is lowerly inserted in the head 403, locks the tubular insert 402 in position.

The connection of the different tubular portions defines a fluid path 400, 410, with double loop at 90°, which connects a water inlet 401 to a water outlet 411. The tubular insert 402 therefore analogously defines a transversal tubular portion which is in flow continuity with the transversal tubular portion 412 of the downstream body 41.

The upstream body 40 and the downstream body 41 are made integral by a joining device 42 with stud screw. The joining device 42 comprises a screw 420 which engages in the threaded bottom 422 of the tubular insert 402. The screw enters from the side of the downstream body 41 and consecutively crosses the transversal tubular portion 412 of the downstream body 41, until it engages in the threaded bottom 422. The screw 420 and the threaded bottom 422 have an outer thread 421 and a respective inner thread 423 which allow the mutual fastening thereof. In assembled configuration, an adhesive, in particular a polymeric adhesive, is arranged between the two mutually engaged threads, which adhesive stabilizes them in position.

A terminal head 424 of the screw 420 comes out of the internal fluid path 400, 410 through a through hole on the downstream body 41, and is housed in a housing seat 44 closed by a finishing plate 7.

At the transition between terminal head 424 and stem, the screw 420 has gasket housing grooves, so as to maintain the sealing between internal fluid path 400, 410 and the housing seat 44.

The terminal head 424 rests on an abutment surface 43 of the housing seat 44, with interposition of a washer of antifriction technopolymer.

The transversal tubular portion 412 has, as in the other variations, an outer cylindrical recess 404, which defines an external portion with lower diameter connected to the outer profile of the body by a shoulder. On the other hand, the blind hole of the head 403, in which the tubular insert 402 enters, has a mouth 406 with diameter higher with respect to the one of the insert, therefore an annular cavity is created between head 403 and tubular insert 402 at the opening of the blind hole.

In the space resulting above the recess 404, a sliding sleeve 45, which is externally surrounded by a finishing bushing 46, is inserted above the intermediate tubular fitting 47 and in the above-described annular cavity.

The sliding sleeve 45 is completely analogous to the one described with reference to the first variation of joint 2. For the description of the structure, reference is therefore made to what was described above, noting that the same numbering has been assigned to identical components by replacing the initial number 2 with the number 4.

It can be noted that the internal portion of the recess 404, as well as the external surface of the intermediate tubular fitting 47 and the one of the tubular insert 402, have grooves for sealing gaskets, which serves to the double purpose of avoiding leakage of water outside the joint and avoiding that the same water wets the surfaces of the sliding sleeve 45.

Figure 11:
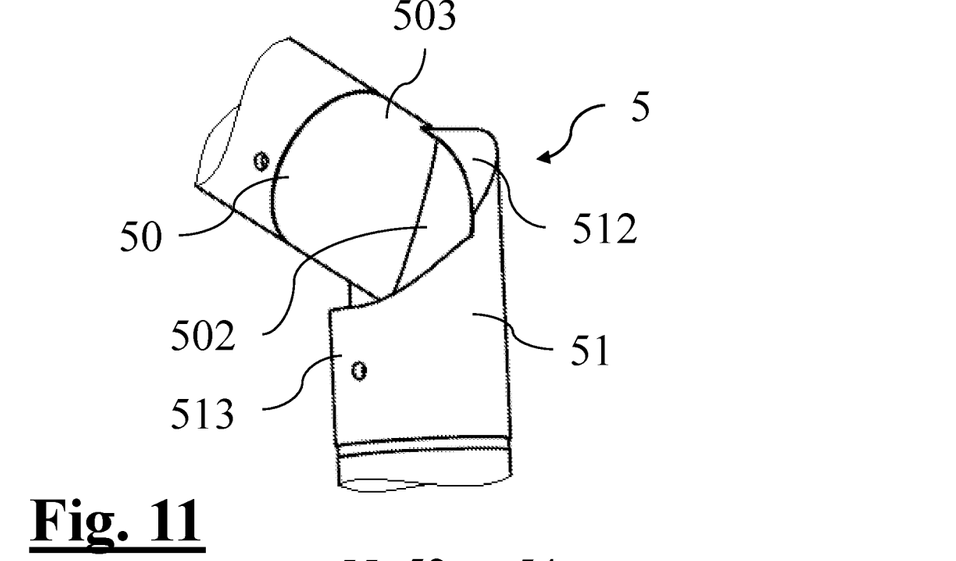
FIG. 11 shows a perspective view of a fourth joint variation according to the present disclosure.
Figure 12:
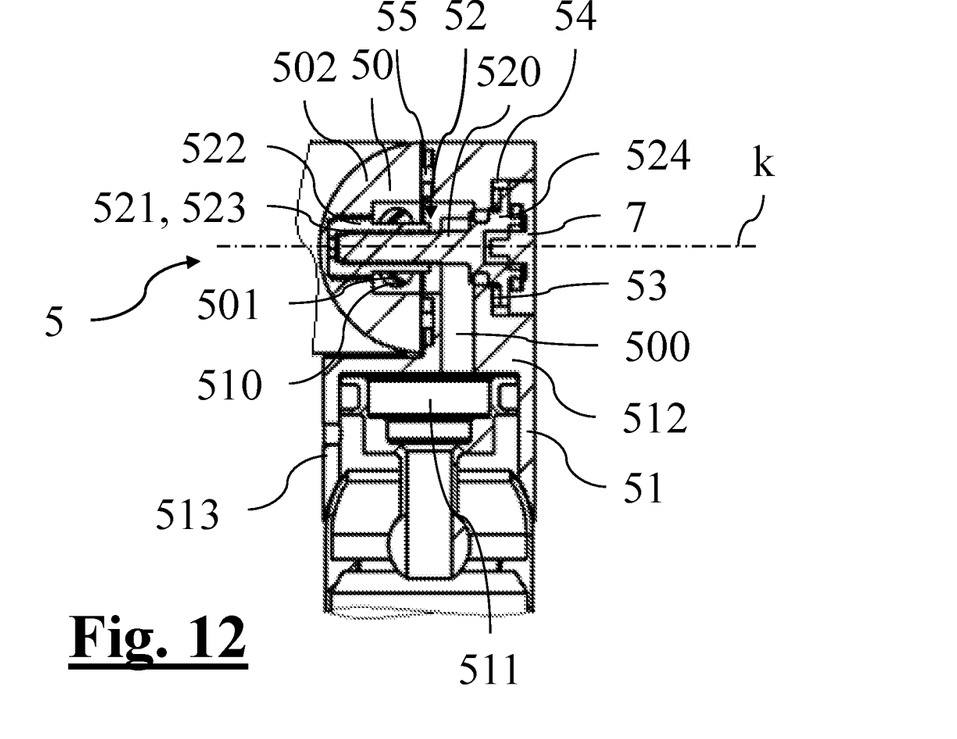
FIG. 12 shows a sectional view of the joint of FIG. 11 with respect to a lying plane of the hinging axis.

Referring to the attached FIGS. 11-12, 5 generically denotes a fourth variation of a joint for hydraulic connection.

The joint 5 according to the fourth variation is provided for example to couple an arm of an articulated faucet with a dispensing shower which is placed laterally with respect to the arm.

The joint is configured as a more compact variation with respect to the joint of the second embodiment. It particularly has an extension reduced along the hinging axis k, considerably equal to the same diameter of the segments or tubes connected to the same joint.

The joint 5 comprises two half-parts, respectively called upstream body 50 and downstream body 51, which are rotatable with respect to each other according to a hinging axis k.

The upstream body 50 and the downstream body 51 both have an attachment portion 503, 513 with circular section and an articulation portion 502, 512 with semicircular portion. The attachment portions 503, 513 respectively engage, by dowel and/or half-ring, on a hydraulic connection segment, for example on the arm of an articulated faucet and on a dispensing shower thereof. The articulation portions 502, 512 are instead near each other, and hinged according to the hinging axis k which is transversal thereto.

The connection of the different tubular portions defines a fluid path 500, 510 which connects a water inlet 501 to a water outlet 511. In particular, such fluid path comprises a rectilinear downstream portion 500 facing an upstream portion 510 which is also rectilinear; between the two rectilinear portions, the fluid crosses the holes opposed to each other of the articulation portions 502, 512 orthogonally deviating along the hinging axis k.

The upstream body 50 and the downstream body 51 are made integral by a joining device 52 with stud screw. The joining device 52 comprises a screw 520 which engages in a threaded insert 522. The screw 520 enters from the side of the downstream body 51 and consecutively crosses the articulation portions 512, 502 of the downstream body 51 and of the upstream body 50, until it engages in the threaded insert 522. The screw 520 and the threaded insert 522 have an outer thread 521 and a respective inner thread 523, respectively, which allow the mutual fastening thereof. In assembled configuration, an adhesive, in particular a polymeric adhesive is placed between the two mutually engaged threads, which adhesive stabilizes them in position.

A terminal head 524 of the screw 520 comes out of the internal fluid path 500, 510 through a through-hole on the downstream body 51, and is housed in a housing seat 54 closed by a finishing plate 7.

At the transition between terminal head 524 and stem, the screw 520 has a gasket housing groove, so as to maintain the sealing between internal fluid path 500, 510 and the housing seat 54.

The terminal head 524 rests on an abutment surface 53 of the housing seat 54, with interposition of a washer of antifriction technopolymer.

A sliding ring 55, made of plastic material with low friction coefficient, is inserted between upstream body 50 and downstream body 51. In the illustrated preferred embodiment, the sliding ring 55 is arranged in a circular mould made on the surface of the articulation portion 512 of the downstream body 51 facing the articulation portion 502 of the upstream body 50: obviously, it is also possible to provide the mould on the upstream body 50 or on both the bodies. At least one sealing gasket is inserted still inside the mould; in particular, in the illustrated embodiment, there are two sealing gaskets, respectively outside and inside with respect to the sliding ring 55.

Referring to FIGS. 13-19, the finishing plate 7 is now described in detail, which finishing plate is made of brass and is intended to occlude the housing seats 24, 34, 44, 54 of the joints 2, 3, 4 and 5 from the view of the user.

It can be initially observed that the above-mentioned figures are an intermediate semifinished product, from which the definitive finishing plate 7 is obtained.

The semifinished product comprises a stem 70 ending in a gripping shank 71 with increased diameter, which eases the different processing to which the finishing plate 7 is subjected: turning, chrome plating and polishing.

Figure 13:
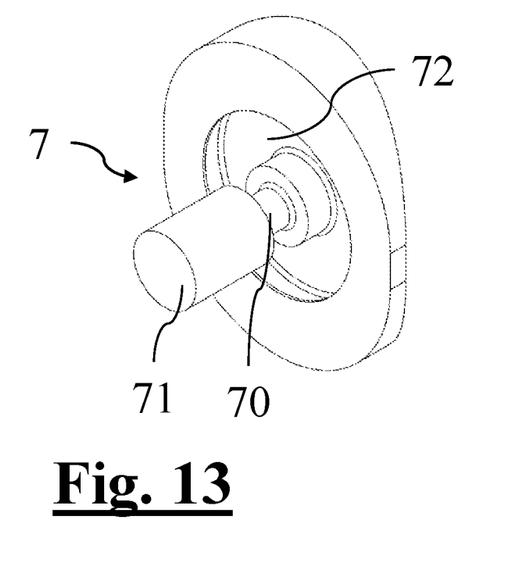
FIG. 13 shows a perspective view of a semifinished finishing plate used in the joints of FIG. 1, FIG. 5, FIG. 9 and FIG. 11.

At the end of said processing, the gripping shank 71 is cut off, leaving only the stem 70 provided to accommodate in the hexagonal seat of the terminal heads 224, 324, 424, 524 of the joining devices 22, 32, 42, 52.

Figure 15:
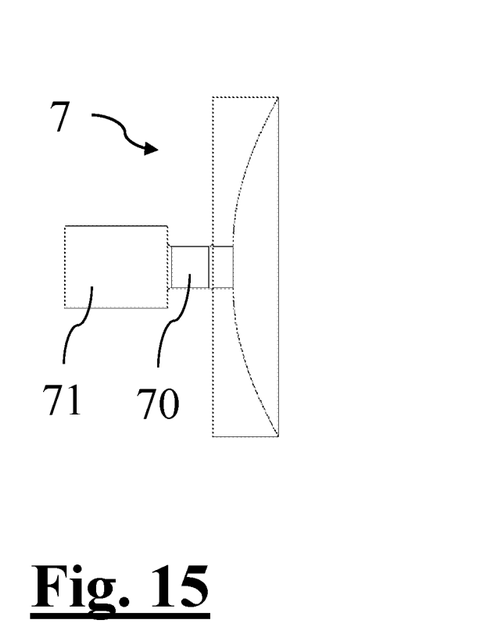
FIG. 15 shows a frontal view of the semifinished product of FIG. 13.
Figure 16:
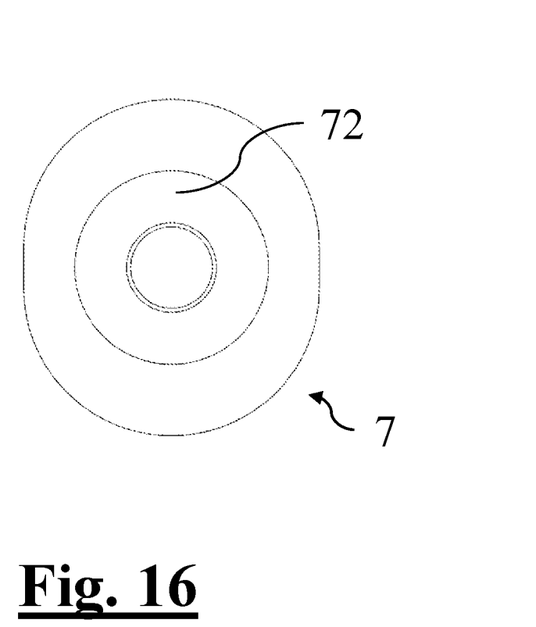
FIG. 16 shows a first lateral view of the semifinished product of FIG. 13.
Figure 17:
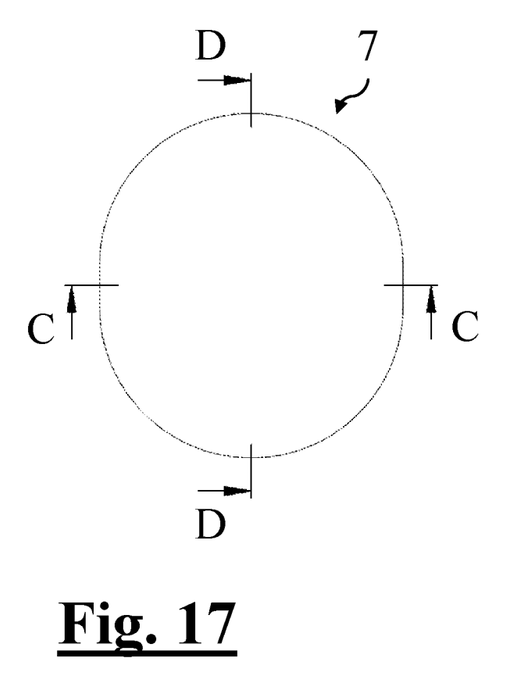
FIG. 17 shows a second lateral view, opposed to the previous one, of the semifinished product of FIG. 13.

The finishing plate 7 has an outer profile which is essentially curvilinear but eccentric, such that it is not rotatable within its own seat.

Figure 14:
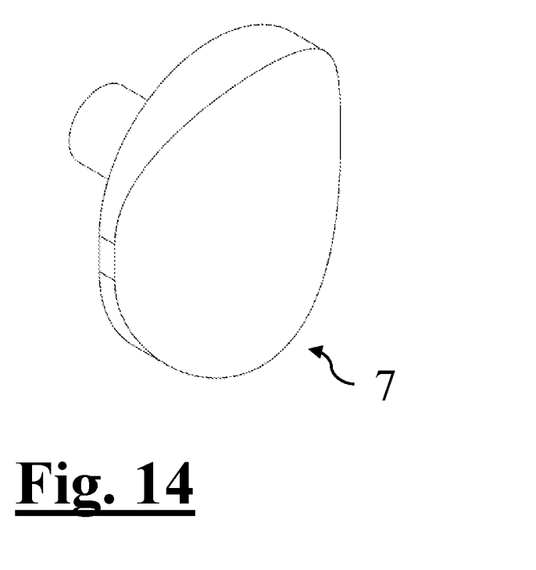
FIG. 14 shows another, differently angled perspective view of the semifinished product of FIG. 13.

The outer face thereof, which is suitably processed and finished, is rounded as visible in FIG. 14.

Figure 18:
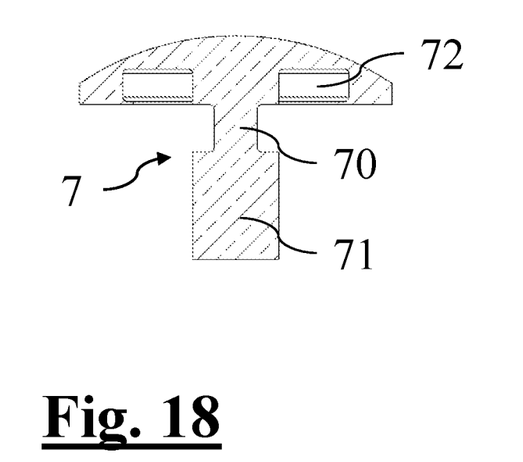
FIG. 18 shows a sectional view of the semifinished finishing plate according to the axis C-C of FIG. 17.
Figure 19:
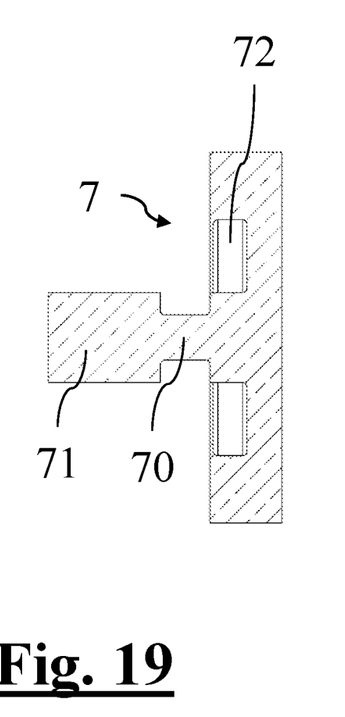
FIG. 19 shows a sectional view of the semifinished finishing plate according to the axis D-D of FIG. 17.

The finishing plate 7 further has, in its internal face, a groove 72 defining an undercut for housing a gasket, and for the engaged coupling above the terminal heads 224, 324, 424, 524.

Obviously, a person skilled in the art, in order to satisfy contingent and specific requirements, may make numerous modifications and variations to the invention described above, all of which are contained moreover within the scope of protection of the invention, as defined by the following claims.

What is claimed is:

1. A joint for hydraulic articulation, comprising:
    an upstream body internally comprising an inlet water path with a water inlet of the joint;
    a downstream body internally comprising an outlet water path with a water outlet of the joint, said inlet water path and said outlet water path being in fluid communication with each other, said joint further comprising a joining device which rotatably couples said upstream body and said downstream body with respect to a hinging axis, said joining device comprising:
        at least one male element extended along said hinging axis and provided with an outer thread; and
        a female element provided with an inner thread, said outer thread being engaged within said inner thread; and
    an adhesive being interposed between said outer thread and said inner thread to lock the male element in the female element, wherein the upstream body and the downstream body both comprise a respective transverse tubular portion, the two transverse tubular portions being coaxial to the hinging axis and their open ends being opposite each other, so as to define a fluid passage between the upstream body and the downstream body, wherein said transverse tubular portions have main portions and end portions, the end portions featuring said open ends, the end portions having a smaller diameter with respect to the main portions.

2. The joint according to claim 1, comprising a sliding sleeve or ring interposed between the upstream body and the downstream body.

3. The joint according to claim 2, wherein the sliding sleeve is externally supported by an end portion of the two transverse tubular portions.

4. The joint according to claim 2, further comprising a cylindrical finishing bushing covering the sliding sleeve.

5. The joint according to claim 2, further comprising an intermediate tubular fitting, inserted between the transverse tubular portion of the upstream body and the transverse tubular portion of the downstream body, the sliding sleeve surrounding said intermediate tubular fitting.

6. The joint according to claim 2, wherein said sliding sleeve is a monolithic sleeve of plastic material.

7. The joint according to claim 1, wherein said joining device is a binding screw which crosses in succession said upstream body and said downstream body.

8. The joint according to claim 1, wherein said joining device is a stud screw comprising a screw which crosses at least one of said upstream body and said downstream body and a threaded insert, which is integral to the other one of said upstream body and said downstream body, wherein the screw engages.

9. A joint for hydraulic articulation, comprising:
    an upstream body internally comprising an inlet water path with a water inlet of the joint;
    a downstream body internally comprising an outlet water path with a water outlet of the joint; said inlet water path and said outlet water path being in fluid communication with each other; said joint further comprising a joining device which rotatably couples said upstream body and said downstream body with respect to a hinging axis; said joining device comprising at least one male element extended along said hinging axis and provided with an outer thread and a female element provided with an inner thread, said outer thread being engaged within said inner thread; and
    an adhesive being interposed between said outer thread and said inner thread to lock the male element in the female element, further comprising a sliding sleeve or ring interposed between the upstream body and the downstream body, wherein said sliding sleeve comprises an inner cylindrical box and an outer cylindrical box which cooperate to define a tubular element with an inner cavity, the outer cylindrical box being sliding above the inner cylindrical box, in the inner cavity of said tubular element there being provided an elastic element which is axially compressed between inner cylindrical box and outer cylindrical box.

10. The joint according to claim 9, wherein said elastic element is a coil spring.

11. A joint for hydraulic articulation, comprising:
    an upstream body internally comprising an inlet water path with a water inlet of the joint;
    a downstream body internally comprising an outlet water path with a water outlet of the joint said inlet water path and said outlet water path being in fluid communication with each other; said joint further comprising a joining device which rotatably couples said upstream body and said downstream body with respect to a hinging axis; said joining device comprising at least one male element extended along said hinging axis and provided with an outer thread and a female element provided with an inner thread, said outer thread being engaged within said inner thread; and
    an adhesive being interposed between said outer thread and said inner thread to lock the male element in the female element, wherein said male element and said female element both comprise a stem provided with a terminal head, said stem or said terminal head being provided with a sealing gasket to avoid water seeping, said terminal head abutting, with the interposition of a friction washer distinct from the sealing gasket, onto an abutment surface respectively of the upstream body and of the downstream body, said terminal head further having a retaining element for retaining a finishing plate.

12. The joint according to claim 11, wherein at least one of said male element and said female element comprises sealing means to avoid the leakage of water outside the joint.

13. The joint according to claim 11, wherein said terminal head is hidden in a housing seat of the upstream body and/or of the downstream body.

14. The joint according to claim 13, wherein said housing seat is closed by a finishing plate of metallic material.

15. The joint according to claim 14, wherein said finishing plate comprises a cut-off stem which extends from an internal face, said cut-off stem deriving from the cutting of a chuck gripping shank.

* * * * *